Jan. 19, 1932.  A. C. WOODBURY  1,841,925

CHAIN DRIVE

Filed March 14, 1927

Inventor
Adin C. Woodbury.

Patented Jan. 19, 1932

1,841,925

UNITED STATES PATENT OFFICE

ADIN C. WOODBURY, OF ALBANY, NEW YORK

CHAIN DRIVE

Application filed March 14, 1927. Serial No. 175,138.

My invention relates to chain drives consisting of chains and sprockets for transmitting power from one rotating shaft to another; and the objects of my invention are to provide a chain having light weight and short pitch in proportion to its ultimate strength, the bearing capacity of its joints, and the contact surface between chain and sprocket, together with a sprocket that shall operate with such chain to help in attaining the same ends.

Figure 1:
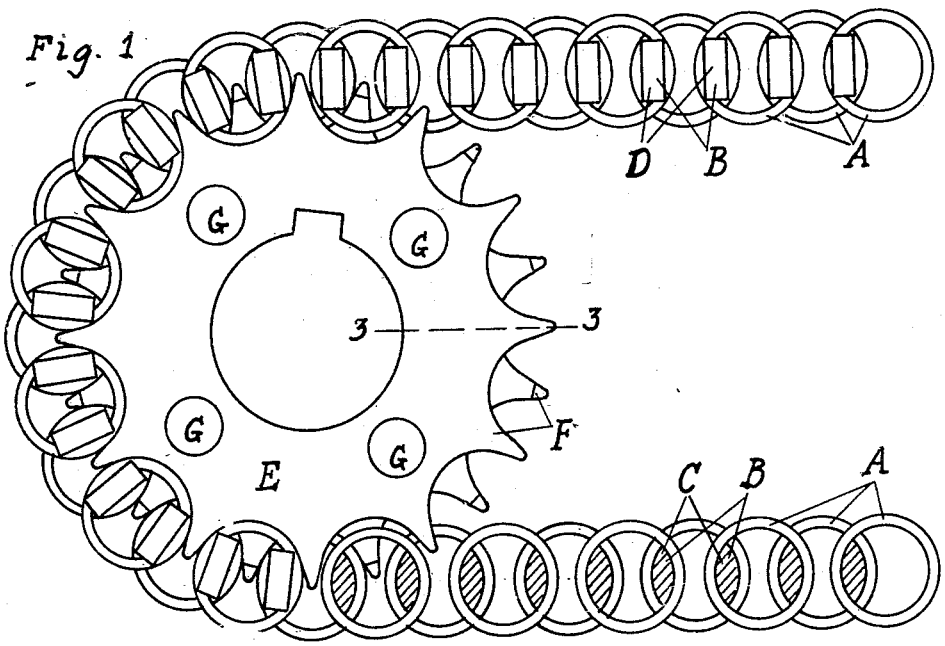
Figure 3:
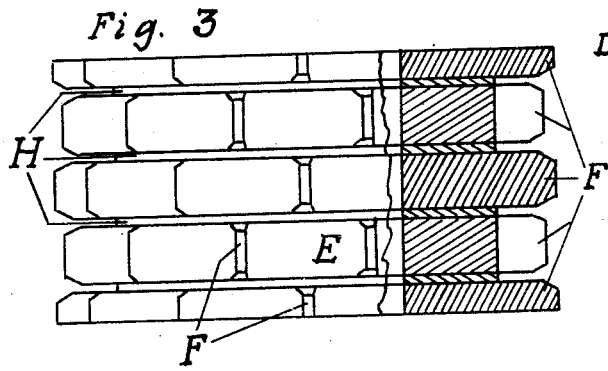
Figure 2:
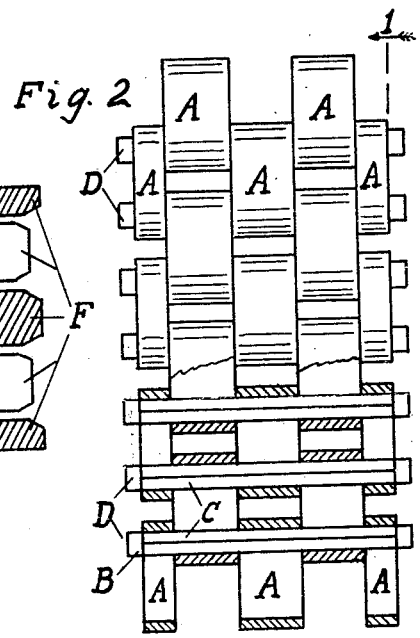

These objects are obtained by the use of the elements shown in the accompanying drawings, in which:

Fig. 1 is a side elevation of a sprocket and a portion of the chain, part of the latter being shown with the heads of the pintles removed to show a section of the working portion of the pintles; Fig. 2 is a plan view of a piece of chain, the lower portion being shown with the ring elements in section; and Fig. 3 is a plan view of the sprocket, one side being shown in section.

The chain consists of cylindrical rings A arranged in staggered rows, the rings in each row overlapping the rings in the ajacent row, with pintles B passing through the overlapping portions of the rings. These pintles B have working portions C with two-convex sides of a curvature substantially equal to the curvature of the inside surfaces of the rings A and being provided with heads D to retain the rings and pintles in their proper relative positions.

The sprocket E consists of a plurality of sections, preferably of one section for each longitudinal row of rings A in the chain, each section having a row of teeth of form suitable to engage the rings A of the chain, with teeth in the various sections staggered to correspond with the staggered arrangement of the rings A of the chain. The various sections may be made of separate parts joined into a rigid unit by rivets G, with spacers H to provide clearance between the sides of the teeth F and chain rings A for easy engagement and to provide for a slight mis-alignment of sprockets.

The chain may also be used with sprockets of other form, particularly with a sprocket similar to that used with a multiple strand roller chain, corresponding to the sprocket E shown but with alternate rows of teeth F omitted, this form being suitable for use at rotative speeds not so high as are allowable with sprocket E.

Having described my invention in what I believe to be its best and most useful form, what I claim as new and desire to have protected by Letters Patent is:

1. A chain drive consisting of an endless chain and sprockets, said chain being made up of overlapping rings joined to each other by transverse pintles, and one of said sprockets having teeth in a plurality of rows, the teeth in one row being located opposite to tooth spaces in an adjacent row.

2. A chain consisting of overlapping links and pintles; said links being circular in form, whereby said links are free to move or shift their position peripherally.

3. A chain consisting of cylindrical rings and pintles having two opposite cylindrical convex sides, said rings being arranged in longitudinal rows with their transverse axes spaced by a distance greater than the outside diameter and less than twice the inside diameter of the rings, with similar adjacent rows offset longitudinally by a distance substantially half the distance between the axes of two rings in the same row, said rings being joined by said pintles passing transversely through the overlapping portions of the rings in the various rows.

4. A chain consisting of rings and pintles, said rings being in the form of hollow cylinders and said pintles having convex working faces of approximately the same curvature as the inside of said rings, said rings being arranged in staggered rows having the rings in some rows overlapping the rings in other rows, said pintles passing through the overlapping portions of said rings.

5. A chain consisting of rings and pintles, said rings being arranged in a plurality of longitudinal rows with the axes of the rings crosswise, part of the rows being offset longitudinally from the others so the axes of all the rings are in twice as many transverse lines as there are rings in one complete row, the rings in the various rows overlapping the rings in the offset rows, said pintles passing through the overlapping portions of said rings and having surfaces substantially conforming to the interior surface of the rings.

6. A chain consisting of cylindrical rings and pintles, said rings being arranged in longitudinal rows with their transverse axes spaced by a distance greater than the outside diameter and less than twice the inside diameter of the rings, with smilar adjacent rows offset longitudinally by a distance substantially half the distance between the axes of two rings in the same row, said rings being joined by said pintles passing transversely through the overlapping portions of the rings in the various rows.

7. A chain drive including a sprocket having a plurality of rows of teeth, the teeth in adajcent rows being staggered, and a chain consisting of rings and pintles, said rings being in the form of hollow cylinders and said pintles having convex working faces of approximately the same curvature as the inside of said rings, said rings being arranged in staggered rows having the rings in some rows overlapping the rings in other rows, said pintles passing through the overlapping portions of said rings.

In testimony whereof I have signed my name to this specification.

ADIN C. WOODBURY.